United States Patent [19]

Ikeda et al.

[11] 4,443,843
[45] Apr. 17, 1984

[54] DC HIGH VOLTAGE GENERATOR FOR A DENTAL X-RAY PHOTOGRAPHING APPARATUS

[75] Inventors: Toshiaki Ikeda, Yahata; Shuhei Furuichi, Shiga; Masakazu Suzuki, Shin Nakamachi, all of Japan

[73] Assignee: Kabushiki Kaisha Morita Seisakusho, Kyoto, Japan

[21] Appl. No.: 277,888

[22] Filed: Jun. 26, 1981

[30] Foreign Application Priority Data

Jun. 27, 1980 [JP] Japan .................................. 55-88056

[51] Int. Cl.³ ......................... H02M 3/18; H05K 7/00
[52] U.S. Cl. ..................................... 363/59; 361/380
[58] Field of Search .................................... 363/59–61, 363/63, 144–146; 361/380, 390–391, 417, 419–420

[56] References Cited

U.S. PATENT DOCUMENTS 2,549,995  4/1951  van Dorsten ........................ 363/59
3,533,010 10/1970  Bowles ............................. 363/59 X
3,781,639 12/1973  Pzschel ............................ 363/63 X

FOREIGN PATENT DOCUMENTS 1563290 11/1970 Fed. Rep. of Germany ........ 363/59

Primary Examiner—Peter S. Wong
Attorney, Agent, or Firm—Koda and Androlia

[57] ABSTRACT

This disclosure relates to a DC high voltage generator disposed on the base which is adapted to freely move into and out of a casing and on which a high voltage transformer circuit is disposed. The transformer circuit comprises a variable magnetic leak transformer and capacitor type multiple boosting circuits disposed separately on the right and left sides of the transformer. The high voltage generator is compact, easy of maintenance and inspection and is excellent in insulating countermeasures and in efficiency.

1 Claim, 5 Drawing Figures

DC HIGH VOLTAGE GENERATOR FOR A DENTAL X-RAY PHOTOGRAPHING APPARATUS

BACKGROUND OF THE INVENTION

1. Field of the Invention

This invention relates to the structure of a DC high voltage generator capable of supplying stable DC high voltage to load.

2. Prior Art

There have heretofore been proposed various types of high voltage generators, and most of the generators are of the construction in which a commercial frequency voltage is boosted by a high voltage transformer and rectified, and then the thus obtained DC high voltage is supplied to load. Accordingly, the generator of this type, in most cases contains a transformer of layer-built iron core and a large capacitor, which results in a large scale device in terms of dimension and weight.

SUMMARY OF THE INVENTION

Accordingly, the invention has for its object the provision of a DC high voltage generator which is compact and easy for maintenance, and excellent both in insulating countermeasures and efficiency.

In the achievement of these objects, there is provided a DC high voltage generator equipped with a high voltage transformer circuit comprising a variable control magnetic leak transformer and capacitor type multiple boosting circuits respectively connected to the secondary side terminals and disposed separately on the right and left sides of said transformer, said transformer circuit being disposed on a base plate adapted to freely move into and out of the casing of the transformer circuit, said capacitor type multiple boosting circuits being contructed of a plurality of capacitors insulated from each other and connected in vertical layers through diodes and one of said circuits being designed to derive positive high voltage by multiply boosting voltage from the lower to the upper with earth potential as the standard and the other of said circuits being designed to derive negative high voltage by multiply dropping voltage from the lower to the upper with earth potential as the standard.

DETAILED DESCRIPTION OF THE INVENTION

A detailed description will now be given of the embodiments of the invention with reference to the accompanying drawings.

Figure 1:
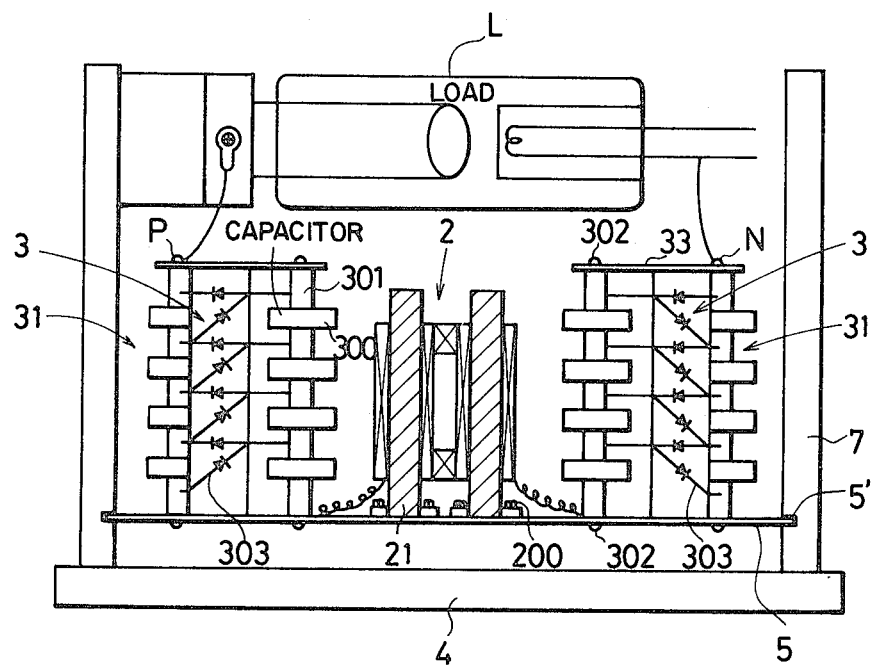
FIG. 1 is a longitudinal sectional front view showing a general structure of the invention.
Figure 2:
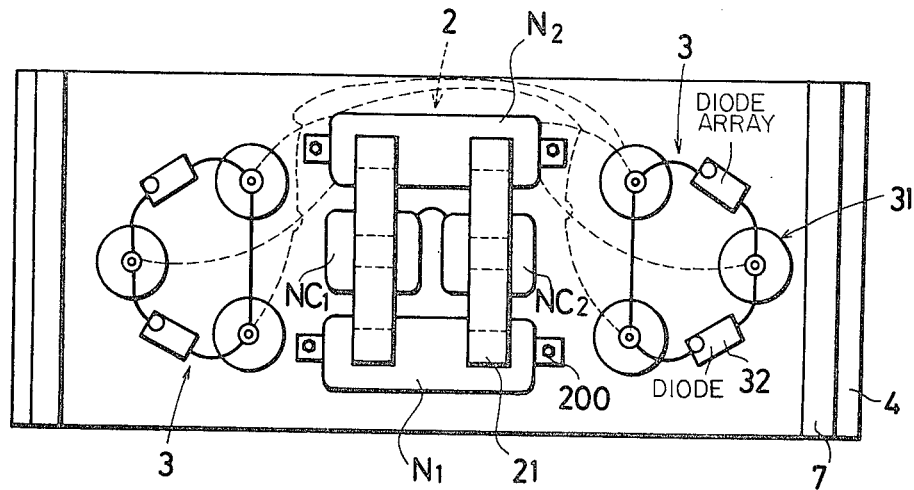
FIG. 2 is a top plan view of the general structure thereof.

FIG. 1 is a longitudinal sectional front view showing the general structure of the invention wherein the invention is used as a high voltage generating circuit for an X-ray generator. In the figure, the numeral 2 designates a variable control magnetic leak transformer and 3 designates a capacitor type multiple boosting circuit. The invention is constructed in the manner that two capacitor type multiple boosting circuits 3,3 are connected to the secondary side of the variable control magnetic leak transformer 2 to thereby dispose a high voltage transformer circuit detachably on a base plate 5 which is designed to move into and out of a casing 4. The structure of the variable control magentic leak transformer 2 is roughly divided into two types, one being of the type shown in FIGS. 1 and 2, and the other being of the type shown in FIGS. 3 and 4. FIG. 1 shows a longitudinal sectional front view of the general structure of the invention and FIG. 2 is a top plan view of the general structure shown in FIG. 1, showing a high voltage transformer circuit established. In the figures, the numeral 2 designates a variable control magnetic leak transformer, and capacitor type multiple boosting circuits 3,3 are respectively disposed on the right and left ends of the transformer and the transformer 2 and the boosting circuits 3,3 are detachably secured to a base plate 5 by bolts 200 . . . and set screws 302 . . . respectively.

The boosting circuits 3,3 consist of three capacitor supports 31 . . . and two diode arrays 32 . . . , and the three capacitor supports 31 . . . are being constructed of capacitors 300 connected to each other in layers one over the other through columnar spaces 301 having lead-in wire attached thereto. The capacitors 300 . . . constituting capacitor supports 31 are cascaded to each other by diodes 303 within two diode arrays 32 . . . .

The typical circuit of the capacitor boosting circuit 2 is well known in the name of a Cockcroft-Walton circuit. This invention is constructed so as to contain the circuit in a DC high voltage generator. The two capacitor type multiple boosting circuits 3,3 respectively comprise, in combination, capacitor supports 31 . . . and diode arrays 32 . . . both of which are the same in structure but they are separated into a positive voltage portion and a negative voltage portion depending upon how the boosting circuits 3,3 are connected to the secondary winding sides N2 of the respective variable control magnetic leak transformer 2 and are constructed so as to generate the positive high voltage and negative high voltage which are multiply boosted from the lower to the upper with earth potential as the standard.

The terminal of the upper part of the positive voltage portion and terminal of the upper part of the negative voltage portion of the capacitor type multiple boosting circuits 3,3 are respectively connected to the positive and negative terminals of load L. In the case of the embodiment shown, an X-ray tube is indicated as load L. But it should be understood that the load of the generator of the invention is not limited to the X-ray tube, and as long as the connected relation between the terminals of the top part of the respective circuits 3,3 and load L is held, for example, the use of the DC high voltage generator of the invention ranges over a wide sphere of electron microscope, sputtering device or the like. The insulating base plate 5 having the high voltage transformer circuit 1 detachably mounted thereon is fitted into the groove 5' provided at a suitable place at the lower portion of the side walls 7,7 of the casing 4 in the manner that the circuit 1 may freely be moved into and out of the casing 4. The primary windings N1 of the variable control magnetic leak transformer 2 is connected to a driving source (not shown). The secondary side windings N2 are respectively connected to the positive and negative portions of the capacitor type multiple boosting circuit 3. Control windings NC1 and NC2 control induction electromotive force generated from the secondary windings N2 of the variable control magnetic leak transformer 2, and control load supply voltage by increasing and decreasing a magnetic flux crossing at right angles with the secondary windings N2 by supplying control winding current to the leak transformer 2. Since it is not the object of the invention to describe in detail the principle of the variable control magnetic leak transformer 2, reference may be made to the copending application filed by the present applicant entitled "DC HIGH VOLTAGE GENERATOR" for a detailed description.

Figure 4:
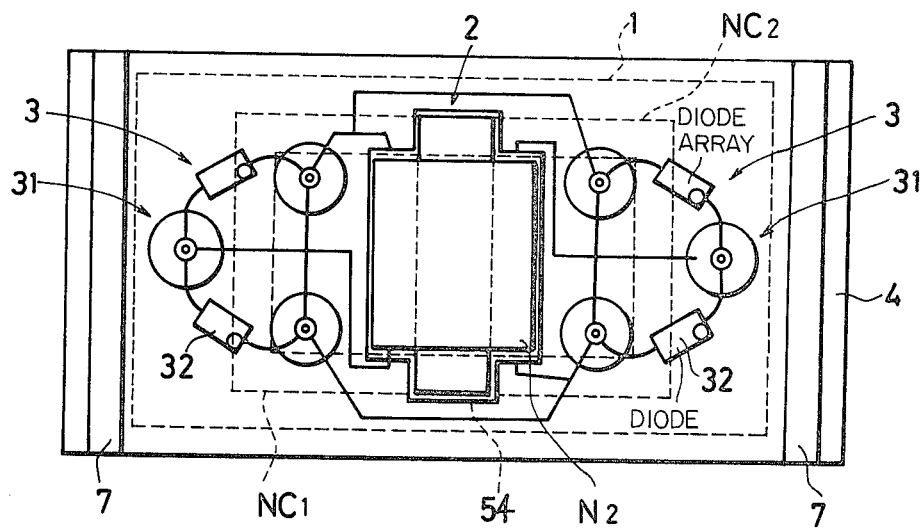
FIG. 4 is a top plan view of the general structure thereof.
Figure 3:
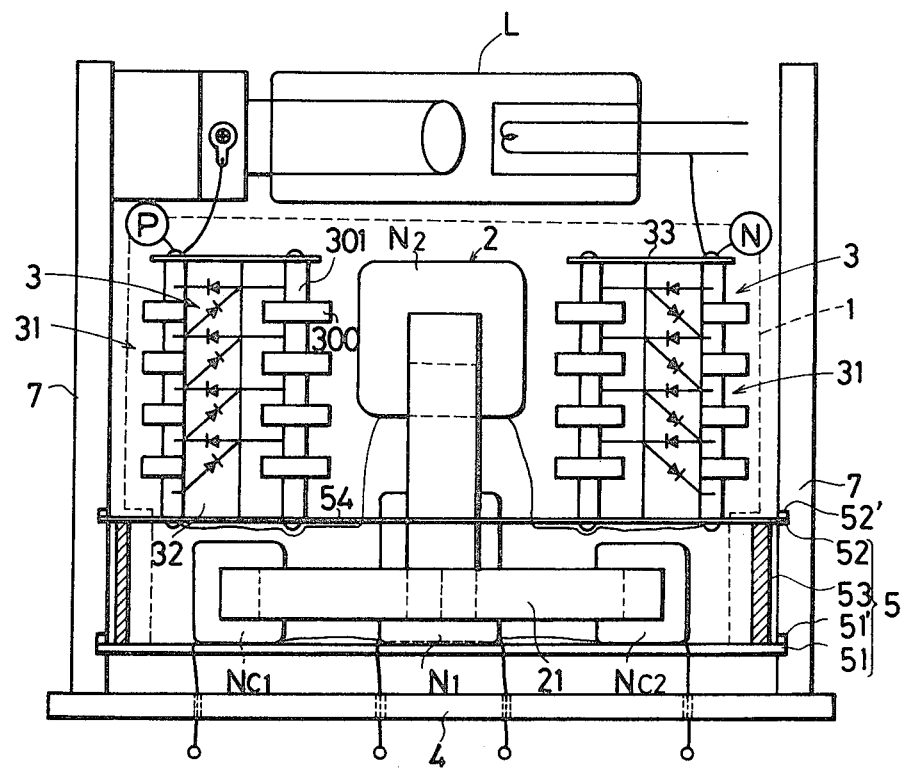
FIG. 3 is a longitudinal sectional front view of the general structure of another embodiment of the invention.

FIGS. 3 and 4 show another embodiment of the invention. FIG. 3 illustrating a longitudinal sectional front view of the general structure of the invention and FIG. 4 illustrating a top plan view of the general structure of the invention showing how the high voltage transformer circuit is disposed. As previously described, this embodiment is different from the first embodiment in the structure of the variable control magnetic leak transformer. This differenence will become apparent from comparison of the structure shown in FIGS. 3 and 4 with that shown in FIGS. 1 and 2.

Namely, in the second embodiment, the transformer 2 assembled with T-shape cores 21 employed as shown in FIG. 3. Accordingly, the base plate 5 for the variable control magnetic leak transformer 2 is of such a double structure that the plate 5 comprises a lower base plate 51 having the transformer 2 mounted thereon and an upper base plate 52 having the capacitor type multiple boosting circuits 3,3 detachably mounted thereon which are the same in structure as that shown in the first embodiment. The variable control magnetic leak transformer 2 in which the T-shape core 21 is used is mounted on the lower base plate 51 with control winding side of the transformer 2 faced downward, and the upper base plate 52 is formed in the middle with an opening 54 for projecting the secondary winding side of the transformer 2 through the opening 54.

The upper base plate 52 and the lower base plate 51 are connected to each other through connection plates 53, 53. Both side portions of the upper base plate 52 and the lower base plate 51 are fitted into grooves 52' and 51' provided at a suitable place in the lower part of the side walls 7,7 of the casing 4.

Accordingly, all that is necessary for a user to do is to draw out the double base plate 5 and to take the transformer circuit 1 out of the casing 4 when maintenance and inspection are required in the same manner as in the case of the first embodiment. In this way, maintenance and inpsection are exceedingly easy. Particularly, when recourse is had to the second embodiment, even if the variable control magnetic leak transformer 2 is increased in size, the transformer can be contained compactly in the casing, with the result that the transformer itself can be increased in capacity over the first embodiment type.

Figure 5:
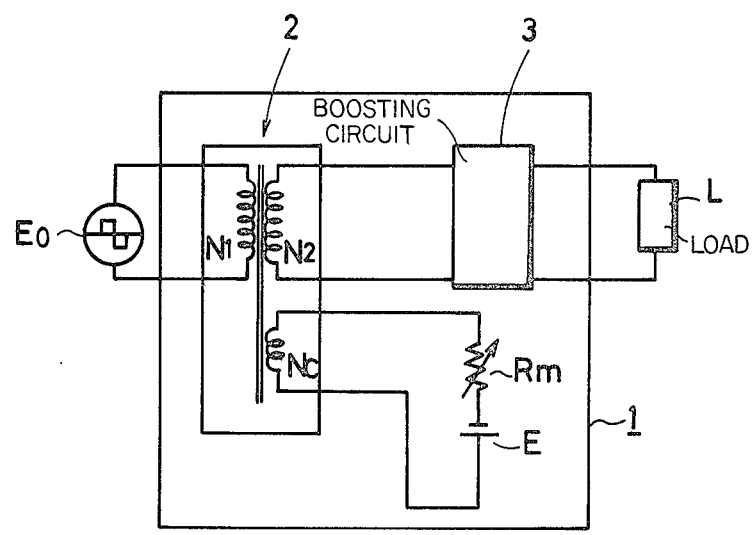
FIG. 5 is an equivalent electric circuit of the invention.

A description will now be given of the principle of the invention on how DC high voltage is generated. An electrically equivalent circuit in time of use of the device of the invention is shown in FIG. 5. In the Figure, the numeral 2 designates a variable control magentic leak transformer; 3 a capacitor type multiple boosting circuit; and L designates load. According to DC high voltage generating principle of the generator of the invention, capacitor type multiple boosting circuits 3,3 are connected to the secondary side of the variable control magnetic leak transformer 2 to thereby form a DC high voltage transformer circuit 1. The sinusoidal wave AC voltage obtained by bringing the equivalent input capacitance of the capacitor type magnetic boosting circuit 3 into resonance with the secondary side equivalent inductance of the variable control magnetic leak transformer 2 of the high voltage transformer circuit 1 has been multiplied and smoothed by the capacitor type multiple boosting circuit 3 and thereafter DC high voltage is supplied to load L.

According to this system, because it becomes possible to supply the load with secondary side voltage multiplied in sharpness by Q times the resonance of the resonance circuit, suitable establishment of equivalent inductance and equivalent capacitance renders it possible to provide an efficient DC high voltage generator.

Also, the reason why the variable control magnetic leak transformer 2 is used because the electromotice force generated on the secondary side of the transformer 2 is freely controlled by supplying control winding current to the transformer 2. When a part of load voltage is detected and control winding current is fed back and controlled by the detected part of load voltage, a stable DC high voltage can be always supplied to the load L.

Particularly, the reason that a stable DC high voltage must be always supplied to load become apparent when an X-ray tube is used as load, and it needs no explanation of how important it is to use stable DC high voltage.

Accordingly, the use of this generator under feedback control is highly useful for the load which is subject to damage by fluctuations in supply power. The invention has the following advantages:

1. Because each capacitor type multiple boosting circuit is separately provided on the right and left sides of the variable control magnetic leak transformer, the circuits are respectively separated into a positive voltage portion and a negative voltage portion, and potential difference between the two multiple circuits can be supplied to load, with the result that insulating countermeasures can be reduced to half.

2. The capacitor type multiple boosting circuits are of the construction in which capacitors are mounted in layers on the base plate and, in the positive voltage portion, high voltage multiply boosted from the lower to the upper with earth potential as the standard is supplied to the positive terminal load, and in the negative voltage portion, high voltage multiply dropped from the lower to the upper earth potential as the standard is supplied to the negative terminal of load, with the result that potential gradient is constant.

3. The base plate having a variable control magnetic leak transformer and capacitor type multiple boosting circuits detachably fixed thereto is constructed so as to be freely moved into and out of the casing, with the result that maintenenace and inspection can be carried out with ease.

4. When the generator of the invention is used by bringing the generator into resonance by a resonance frequency determined by the secondary side equivalent inductance of the variable control magnetic leak transformer and the equivalent input capacitance of the capacitor type multiple boosting circuit, highly efficient DC high voltage can be supplied to load.

5. Also, when the generator of the invention is used under the condition of resonance driving, the charging current generated at initial time of charging of the capacitor type multiple boosting circuits becomes sinusoidal current, and accordingly even if pulse power steeple in rise-up is used for input power, damage of diodes by surge current is greatly reduced. Accordingly, the generator as a whole is prolonged in its service life to the benefit of the user.

We claim:

1. A DC voltage generator for a dental X-ray photographing apparatus wherein a high voltage transformer circuit comprises capacitor type multiple boosting circuits which are connected to a secondary side of a variable magnetic leak transformer with a reverse T-shaped core and in which a plurality of mutually insulated capacitors are vertically laminated via diodes, said boosting circuits being disposed vertically facing with each other on a right and left sides of said secondary winding of said variable magnetic transformer, said high voltage transformer circuit being removably mounted on a double base plate comprising a base plate on which said transformer is placed with its control winding side directed downward, and a base plate in which a window is provided at a center and the secondary winding projects through the window so that said capacitor type multiple boosting circuits can be loaded and unloaded and the high voltage transformer circuit can be loaded into and unloaded from the base plate, the X-ray tube being disposed superjacent control windings of said variable leakage transformer with the secondary windings of said variable magnetic leak transformer in between said X-ray tube and said control windings and positive high voltage obtained by upward multiple boosting of one of said capacitor type multiple boosting circuits and negative high voltage obtained by downward multiple boosting of another boosting circuit with reference to the ground potential are respectively supplied to positive and negative terminals of said X-ray tube.

* * * * *